United States Patent
Hughes et al.

[15] 3,666,858

[45] May 30, 1972

[54] UTILIZATION OF GON-4-ENE THERAPY IN TREATMENT OF FEMALES AND IN GROWTH STIMULATION

[72] Inventors: Gordon Alan Hughes, Haverford; Herchel Smith, Wayne, both of Pa.

[73] Assignee: said Smith, by said Hughes

[22] Filed: June 29, 1967

[21] Appl. No.: 649,800

Related U.S. Application Data

[60] Continuation-in-part of Ser. No. 489,077, Sept. 21, 1965, abandoned, which is a division of Ser. No. 337,823, Jan. 15, 1964, which is a division of Ser. No. 228,384, Oct. 4, 1962, which is a continuation of Ser. Nos. 51,904, Sept. 23, 1960, abandoned, and Ser. No. 91,341, Feb. 24, 1961, abandoned, and Ser. No. 137,535, Sept. 12, 1961, abandoned, and Ser. No. 195,000, May 15, 1962, abandoned, and Ser. No. 196,557, May 16, 1962, abandoned.

[52] U.S. Cl. .............................................. 424/243, 99/2 G
[51] Int. Cl. ........................................................ A61k 27/00
[58] Field of Search ...................................... 424/243; 99/2 G

[56] References Cited

UNITED STATES PATENTS

| | | | |
|---|---|---|---|
| 3,152,956 | 10/1964 | Nomine et al. | 167/74 |
| 3,231,589 | 1/1966 | Greenspan et al. | 260/397.4 |

OTHER PUBLICATIONS

Remingtons Practice of Pharmacy, 12 ed Eric Martin et al., Mack Publishing Co., Easton, Pa. (1961) I p. 940; II p. 943.
Acta Endocrinologica, Supp. No. 87 pp. 3– 6.

*Primary Examiner*—Albert T. Meyers
*Assistant Examiner*—Vincent D. Turner
*Attorney*—Vito Victor Bellino

[57] ABSTRACT

Methods of using certain 13-ethyl-gon-4-enes are described, namely 13$\beta$,17$\alpha$-diethyl-17$\beta$-hydroxygon-4-en-3-one, and the decanoate ester of 13$\beta$-ethyl-17$\beta$-hydroxygon-4-en-3-one for growth stimulation in mammals; and 13$\beta$-ethyl-17$\alpha$-ethynyl-17$\beta$-hydroxygon-4-en-3-one, to treat dysfunctions of the female reproductive system in mammals, to control cyclic regularity, and to prevent conception in female mammals.

13 Claims, No Drawings

UTILIZATION OF GON-4-ENE THERAPY IN TREATMENT OF FEMALES AND IN GROWTH STIMULATION

This application is a continuation-in-part of Ser. No. 489,077 filed 1965 Sept. 21 now abandoned, which is a division of co-pending application Ser. No. 337,823 filed 1964 Jan. 15, which in turn is a division of Ser. No. 228,384 filed 1962 Oct. 4, which is a continuation of applications Ser. No. 57,904 filed 1960 Sept. 23, now abandoned; Ser. No. 91,341 filed 1961 Feb. 24, now abandoned; Ser. No. 137,535 filed 1961 Sept. 12, now abandoned; Ser. No. 195,000 filed 1962 May 15, now abandoned; and Ser. No. 196,557 filed 1962 May 16, now abandoned.

This application relates to compositions of matter classified in the art of chemistry as substituted unsaturated gonane derivatives, and to processes for making and using such compositions.

The invention sought to be patented in a process of use aspect is described as residing in the concept of administering pharmaceutically effective doses of 13$\beta$, 17$\alpha$-diethyl-17$\beta$-hydroxygon-4-en-3-one to stimulate growth in mammals.

Clinical tests have demonstrated that so-used said compound shows high anabolic potency and an unexpected separation of anabolic and androgenic activities; said process therefore being of value to aid weight gain and nitrogen retention, post-operative recovery, healing of wounds, and healing of burns.

The invention sought to be patented in a second process of use aspect is described as residing in the concept of administering pharmaceutically effective doses of the decanoate ester of 13$\beta$-ethyl-17$\beta$-hydroxygon-4-en-3-one to stimulate growth in mammals.

Clinical tests have demonstrated that so-used said compound shows long-acting anabolic effects accompanied by unexpected separation of other steroidal activities; said process therefore being of value to aid weight gain and nitrogen retention, post-operative recovery, healing of wounds, and healing of burns.

The invention sought to be patented in a third process of use aspect is described as residing in the concept of administering pharmaceutically effective doses of 13$\beta$-ethyl-17$\alpha$-ethynyl-17$\beta$-hydroxygon-4-en-3-one to treat dysfunctions of the female reproductive system in mammals, control cyclic regularity in female mammals, and to prevent conception in female mammals.

Clinical tests have demonstrated that, so-used, said compound is a valuable agent for the treatment of dysmenorrhea, infertility, habitual and threatened abortion and for control of conception. Said process of use can relate to the use of the compound by itself or in combination with other medicaments as for example, with an estrogen.

The manner and process of making the chemical compounds, which are used in the process as of the invention are described in co-pending U.S. Pat. application Ser. No. 337,823, filed 1964 Jan. 15.

The manner of using the invention will now be generally described so as to enable a person skilled in the art to use the same, as follows:

Pharmaceutically acceptable carriers can be either solid or liquid. Solid form preparations include powders, tablets, dispersible granules, capsules, cachets, and suppositories. A solid carrier can be one or more substances which may also act as diluents, flavoring agents, solubilizers, lubricants, suspending agents, binders, or tablet-disintegrating agents: it can also be an encapsulating material. In powders the carrier is a finely divided solid which is in admixture with the finely divided compound. In tablets the compound is mixed with carrier having the necessary binding properties in suitable proportions and compacted in the shape and size desired. The powders and tablets preferably contain from 5 or 10 to 99 percent of the active ingredient. Suitable solid carriers are magnesium carbonate, magnesium stearate, talc, sugar, lactose, pectin, dextrin, starch, gelatin, tragacanth, methyl cellulose, sodium carboxymethylcellulose, a low melting wax, and cocoa butter.

The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets, and capsules can be used for oral administration.

Liquid form preparations include solutions, suspensions, and emulsions. The compounds are insoluble in water, but can be dissolved in aqueous-organic solvent mixtures that are non-toxic in the amounts used. As an example may be mentioned water-propylene glycol solutions for parenteral injection. Liquid preparations can also be formulated in solution in aqueous polyethylene glycol solutions. Aqueous suspension suitable for oral use can be made by dispensing the finely divided compound in water with viscous material, natural or synthetic gums, resins, etc., for example, gum arabic, ion-exchange resins, methylcellulose, sodium carboxymethylcellulose and other well-known suspending agents.

Preferably the pharmaceutical preparation is in unit dosage form. In such form, the preparation is subdivided in unit doses containing appropriate quantities of the compound: the unit dosage form can be a packaged preparation, the package containing discrete quantities of preparation, for example, packeted powders of vials or ampules. The unit dosage form can be a capsule, cachet, or tablet itself, or it can be the appropriate number of any of these in packaged form. The quantity of compound in a unit dose of preparation may be varied or adjusted from 0.015 to 100 mg (generally within the range of 2.5 to 25 mg, except for contraceptive use wherein the preferred daily dose is from about 0.015 mg (15 micrograms) to about 10 mg., normally to about 1 mg (1,000 micrograms)) according to the particular application and the potency of the active ingredient.

The compositions can be incorporated into pharmaceutical formulations for sustained or controlled release, orally by means known to those skilled in the pharmaceutical art, or for implantation within the body as, for example, described in U.S. Pat. No. 3,279,996.

Representative formulations embodying specific compositions of this invention follow:

A pharmaceutical tablet for use as an oral growth-stimulant consists of the following ingredients:

| | mg |
|---|---|
| 13$\beta$, 17$\alpha$-Diethyl-17$\beta$-hydroxygon-4-en-3-one | 5 |
| Carboxymethylcellulose (viscosity 400 cps) | 15 |
| Lactose powder | 25 |
| Redried corn starch | 25 |
| Magnesium stearate powder | 4 |
| Calcium silicate powder | q.s. |
| Total: | 200 |

A capsule for use as an oral growth-stimulant contains, in encapsulating gelatin, the following ingredients:

| | mg |
|---|---|
| 13$\beta$, 17$\alpha$-Diethyl-17$\beta$-hydroxygon-4-en-3-one | 5 |
| Finely divided silica lubricant | 5 |
| Magnesium stearate powder | 5 |
| Powdered corn starch | 113 |
| Lactose powder | q.s. |
| Total: | 245 |

A growth-stimulating suspension for oral use consists of the following ingredients per 5 cc:

| | mg |
|---|---|
| 13$\beta$, 17$\alpha$-Diethyl-17$\beta$-hydroxygon-4-en-3-one | 5.0 |
| Magnesium aluminum silicate (thickening agent) | 37.5 |
| Carboxymethylcellulose of low viscosity | 37.5 |
| Polyoxyethylene sorbitan monolaurate | 50.0 |
| Glycerin | 250.0 |
| Sucrose | 2000.0 |
| Methyl p-hydroxybenzoate | 5.0 |
| Propyl p-hydroxybenzoate | 1.0 |
| Flavor and distilled water | q.s. |

A growth-stimulating syspension for parenteral use consists of the following ingredients per cc:

|  | mg |
|---|---|
| 13β, 17α-Diethyl-17β-hydroxygon-4-en-3-one | 0.5 |
| Benzyl alcohol | 10.0 |
| Sodium chloride | 90.0 |
| Polyoxyethylene sorbitan monooleate | 4.0 |
| Sodium carboxymethylcellulose | 5.0 |
| Water for injection | q.s. |

Pediatric drops for use as growth-stimulant consist of the following ingredients per drop (0.05 cc):

|  | mg |
|---|---|
| 13β, 17α-Diethyl-17β-hydroxygon-4-en-3-one | 0.500 |
| Magnesium aluminum silicate (thickening agent) | 0.375 |
| Polyoxyethylene sorbitan monolaurate | 0.500 |
| Disodium phosphate heptahydrate | 0.375 |
| Citric acid monohydrate | 0.060 |
| Glycerin | 1.250 |
| Methyl p-hydroxybenzoate | 0.025 |
| Propyl p-hydroxybenzoate | 0.005 |
| Butyl p-hydroxybenzoate | 0.020 |
| Distilled water | 0.015 |
| Sodium saccharin | 0.013 |
| Sorbitol and flavor | q.s. |

A long-acting growth-stimulating tablet consists of the following ingredients:

|  | mg |
|---|---|
| 13β, 17α-Diethyl-17β-hydroxygon-4-en-3-one | 5 |
| Water-insoluble acid carboxyvinyl polymer of acrylic acid copolymerized with 0.75-2% of polyallyl sucrose (the Carbopol 934 of U.S. Patent 2,909,462) | 150 |
| Magnesium stearate powder | 2 |
| Lactose | q.s. |

A long-acting growth-stimulating suspension for parenteral use consists of the following ingredients per cc:

|  | mg |
|---|---|
| 13β-Ethyl-17β-hydroxygon-4-en-3-one 17-decanoate | 0.5 |
| Benzyl alcohol | 10.0 |
| Sodium chloride | 90.0 |
| Polyoxyethylene sorbitan monooleate | 4.0 |
| Sodium carboxymethylcellulose | 5.0 |
| Water for injection | q.s. |

A tablet for treating female dysfunctions consists of the following ingredients:

|  | mg |
|---|---|
| 13β-Ethyl-17α-ethynyl-17β-hydroxygon-4-en-3-one | 5 |
| Spray dried lactose | 75 |
| Methocel (400 cps) | 12 |
| Powdered stearic acid | 6 |
| Talc | 2 |

Other tablets for treating female dysfunctions or for cyclic control consist of the following ingredients:

|  | mg | mg | mg |
|---|---|---|---|
| 13β-Ethyl-17α-ethynyl-17β-hydroxygon-4-en-3-one | 2.5 | 5.0 | 10.0 |
| Methylcellulose, 400 cps., U.S.P. | 12.0 | 12.0 | 24.0 |
| Stearic acid powder, U.S.P. | 3.0 | 3.0 | 6.0 |
| Talcum, U.S.P. | 1.0 | 1.0 | 3.0 |
| Lactose (spray dried), U.S.P., q.s. ad | 100.0 | 100.0 | 200.0 |

|  | mg |
|---|---|
| 13β-Ethyl-17α-ethynyl-17β-hydroxygon-4-en-3-one | 2.50 |
| Ethynyl estradiol, U.S.P. | 0.05 |
| Avicel (American Viscose Corporation) | 20.00 |
| Magnesium stearate, U.S.P. | 0.80 |
| Lactose, U.S.P., q.s. ad | 100.00 |

A capsule for treating female dysfunctions or for cyclic control consists of the following ingredients:

|  | mg | mg |
|---|---|---|
| 13β-Ethyl-17α-ethynyl-17β-hydroxygon-4-en-3-one | 2.50 | 0.50 |
| Ethynyl estradiol, U.S.P. | 0.05 | 0.05 |
| Magnesium stearate, U.S.P. | 15.00 | 15.00 |
| Lactose, U.S.P., q.s. ad | 350.00 | 350.00 |

Microdose formulations for contraceptive use consists of the following ingredients:

|  | mg | mg | mg | mg |
|---|---|---|---|---|
| 13β-Ethyl-17α-ethynyl-17β-hydroxygon-4-en-3-one | 0.015 | 0.025 | 0.050 | 0.075 |
| Microcrystalline cellulose, N.F. | 20.000 | 20.000 | 20.000 | 20.000 |
| Amberlite IRP-88 (Rohm and Haas) | 1.000 | 1.000 | 1.000 | 1.000 |
| Magnesium stearate, U.S.P. | 0.220 | 0.220 | 0.220 | 0.220 |
| Lactose, U.S.P., q.s. ad | 100.000 | 100.000 | 100.000 | 100.000 |

Representative clinical histories to illustrate how to use the growth stimulating compound 13β, 17α-diethyl-17β-hydroxygon-4-en-one in the process of this invention follow:

K.I., male, age 25 years; regional ileitis of 7.5 years duration with anorexia, weight loss and fatigue. Received vitamins (including $B_{12}$) without any appreciable effect. Administered 13β, 17α-diethyl-17β-hydroxygon-4-en-one, 5 mg per day for 26 days and 7.5 mg per day for 94 days (total treatment period, 4 months). Weight increased from 150 to 174 pounds (24 pounds or 16 percent). Appetite and feeling of well-being improved; fatigue diminished. Hemoglobin increased from 12.6 to 13.8 g. percent. Blood glucose increased from 70 to 80 mg. per 100 ml. No side effects.

P.K., female, age 25 years; ulcerative colitis for 5 years with anorexia and weight loss. Received vitamins (including $B_{12}$) without effect. 13β, 17α-diethyl-17-hydroxygon-4-en-one, 5 mg per day, for 96 days was administered. Weight increased from 90 to 103 pounds (13 pounds or 14 percent). Appetite and feeling of well-being improved. Blood glucose increased from 72 to 80 mg. per 100 ml. No side effects.

A.A., male, age 13 years; moron with retarded growth and development. Received 13β, 17α-diethyl-17β-hydroxygon-4-en-one, 2.5 mg. per day, for 18 days. Nitrogen retention increased significantly from control value of −1.13 g. daily to +1.2 g. daily during treatment and decreased significantly to +0.13 g. daily in the period following treatment (total net gain in nitrogen, +21.6 g.).

R.M., male, age 10 years; moron with retarded growth and development. Received 13β, 17α-diethyl-17β-hydroxygon-4-en-one, 2.5 mg. per day, for 10 days. Nitrogen retention increased significantly from control value of −1.1 g. daily to +1.62 g. daily during treatment and decreased significantly to 0.0 g. daily in the period following treatment (total net gain in nitrogen, +17.8 g.).

W.M., male, age 13 years; moron with retarded growth and development. Received 13β, 17α-diethyl-17β-hydroxygon-4-en-one, 2.5 mg. per day, for 2 months. Nitrogen retention increased significantly from control value of −2.6 g. daily to +1.76 g. daily during treatment (total net gain in nitrogen for treatment period, +37.0 g.).

R.P., male, age 14 years; moron with retarded growth and development. Received 13β, 17α-diethyl-17β-hydroxygon-4-en-one, 2.5 mg. per day, for 6 weeks. Nitrogen retention increased significantly from control value of −1.2 g. daily to +1.0 g. daily during treatment and continued at 0.8 g. daily in the period following treatment (total net gain in nitrogen, +22.0 g.).

W.S., male, age 9 years; moron with retarded growth and development. Received 13β, 17α-diethyl-17β-hydroxygon-4- en-one, 2.5 mg. per day for 7 weeks. Nitrogen retention increased significantly from control value of −1.0 g. daily to +1.2 g. daily during treatment and decreased significantly to −0.6 g. daily in the period following treatment (total net gain in nitrogen, +21.6 g.).

Male, age 21 years; flash burn of three-fourths of total body surface — 40 percent of third degree and 60 percent of second degree intensity. Received 13β, 17α-diethyl-17β-hydroxygon-4-en-one, 15 mg. per day, beginning 12 days after burn and continuing for 4 days. Urinary nitrogen-to-creatinine ratio decreased from 15.4 to 7.6. Potassium excretion decreased from 174 to 65 mEq/L.

Female, age 12 years; debility post-appendectomy. Received 13β, 17α-diethyl-17β-hydroxygon-4-en-one, 6 mg. per day, beginning 7 days after operation and continuing for 3 days. Urinary nitrogen-to-creatinine ratio decreased from 4.5 to 0.85. Potassium excretion decreased from 96 to 42 mEq/L.

Male, age 4 years; debility following fractures of right radius and ulna and supracondylar fracture of right humerus. Received 13β, 17α-diethyl-17β-hydroxygon-4-en-one, 4 mg. per day, beginning 7 days after injury and continuing for 4 days. Urinary nitrogen-to-creatinine ratio decreased from 5.4 to 2.8. Potassium excretion decreased from 75 to 28 mEq/L.

H.L., female, age 80 years; general senile debility. Received 13β, 17α-diethyl-17β-hydroxygon-4-en-one, 5 mg. per day, for 21 days. Nitrogen retention during the treatment period increased from control value of +5.5 g. daily to +7 g. daily (total net gain, +31.5 g.), and the increase was being sustained at one week post treatment. Phosphorus and calcium balances also increased during treatment. Body weight increased by 3 pounds.

J.F., Male, age 62 years; general senile debility. Received 13β, 17α-diethyl-17β-hydroxygon-4-en-one, 5 mg. per day, for 21 days. Nitrogen retention during the treatment period increased from control value of −0.36 g. daily to +4 g. daily (total net gain, +91.56 g.). Nitrogen retention was sustained at a lesser value, +2.5 g. daily, during the week after treatment was discontinued. Phosphorus and calcium balances also increased during treatment. Body weight increased by 2 pounds.

W.C., male, age 59 years; general debility. Received 13β, 17α-diethyl-17β-hydroxygon-4-en-one, 5 mg. per day for 14 days and 7.5 mg. per day for 7 days. Nitrogen retention during the treatment period increased from control value of −3 g. daily to +16.67 g. daily (total net gain, +413 g.). Phosphorus and calcium balances also increased. The body weight change was not recorded.

N.C., female, age 27 years; anorexia nervosa and underweight. Previous treatment unsatisfactory. Received 13β, 17α-diethyl-17β-hydroxygon-4-en-one, 1.25 mg. 3 times a day, for 14 days (total, 52.5 mg.). Measurable improvement in appetite and food intake. Body weight increased from 88-¼ to 95-½ pounds (7-¼ pounds or 8 percent). No side effects.

R.R., female, age 41 years; underweight. Previous treatment unsatisfactory. Received 13β, 17α-diethyl-17β-hydroxygon-4-en-one, 2.5 mg. per day, for 50 days. After a rest period of 25 days, 13β, 17α-diethyl-17β-hydroxygon-4-en-one was resumed at a dosage of 1.25 mg. per day and was continued for 100 days more (total, 250 mg.). Measurable improvement in appetite and food intake. Body weight increased from 109 to 114 pounds (5 pounds or 5 percent) in first 38 days of treatment. In same period, hemoglobin increased from 11.6 to 12.5 g. percent.

S.L., female, age 20 years; underweight. Previous treatment unsatisfactory. Received 13β, 17α-diethyl-17β-hydroxygon-4-en-one, 1.25 mg. per day, for 21 days (total, 26.25 mg.). Measurable improvement in appetite and food intake. Body weight increased from 107 to 117 pounds (10 pounds or 9 percent) in 57 days. No side effects.

S.P., female, age 25 years; underweight. Previous treatment unsatisfactory. Received 13β, 17α-diethyl-17β-hydroxygon-4-en-one, 1.25 mg. 2 times a day, for 25 days (total, 62.5 mg.). Measurable improvement in appetite and food intake. Body weight increased from 100 to 107-¾ pounds (7-¾ pounds or 8 percent) in treatment period. No side effects.

R.N., male, age 17 years; retarded growth. No results from previous treatment. Received 13β, 17α-diethyl-17β-hydroxygon-4-en-one, 1.25 mg. 3 times a day, for 17 days. After a rest period of 17 days, 13β, 17α-diethyl-17β-hydroxygon-4-en-one was resumed at a dosage of 1.25 mg. 2 times a day for 25 days, followed by 1.25 mg. 3 times a day for 17 days. After a second rest period of 17 days, the treatment course was repeated (total dosage, 252.5 mg.). Body weight increased from 98-¾ to 110 pounds (11-¼ pounds or 11 percent) in 5 months. Grew from 62 inches to 62-⅞ inches tall in same period.

P.U., male, age 12 years; retarded growth (genitalia normal for age). Previous treatment unsatisfactory. Received 13β, 17α-diethyl-17β-hydroxygon-4-en-one, 1.25 mg. per day, for 50 days. Body weight increased from 69-¾ to 79 pounds (9-¼ pounds or 13 percent) in 7 months. Grew from 53 inches to 56-⅞ inches tall in same period. Bone age 10-½ years (retarded) at beginning of treatment; unchanged after 7 months. No side effects. Genitalia normal after treatment.

D.G., female, age 45 years; pulmonary tuberculosis. Received 13β, 17α-diethyl-17β-hydroxygon-4-en-one, 2.5 mg. per day, for 7-½ weeks. Weight increased from 123-¾ to 145 pounds (21-½ pounds or about 17 percent) during treatment. Continued to gain post treatment (2 pounds in 11 days).

J.T., male, age 29 years; pulmonary tuberculosis. Received 13β, 17α-diethyl-17β-hydroxygon-4-en-one, 2.5 mg. per day, for 7-½ weeks. Weight increased from 125-½ to 134 pounds (8-½ pounds or about 7 percent) during treatment. No gain or loss in weight post treatment (still 134 pounds at 5-½ weeks).

Representative clinical histories to illustrate how to use the growth-stimulating compound 13β-ethyl-17β-hydroxygon-4-en-3-one 17-decanoate in the process of this invention follow:

D.C., male, age 10 years; cultural familial mental retardation and failure of physical development. Received weekly intramuscular injections of 13β-ethyl-17β-hydroxygon-4-en-3-one 17-decanoate, 40 mg. for 6 weeks and 80 mg. for 3 weeks (total dose, 480 mg.). Height 51 inches and weight 56-¼ pounds when treatment began; increased to 52 inches and 66-½ pounds in 12 weeks (gains of 2 percent and 18 percent, respectively). Growth was continuing post treatment. Attention span improved; was less easily distracted.

M.C., male, age 11 years; encephalopathy, with history of major motor seizures (electroencaphalograms normal at time of treatment) and failure of physical development. Received weekly intramuscular injections of 13β-ethyl-17β-hydroxygon-4-en-3-one 17-decanoate, 40 mg. for 6 weeks and 80 mg. for 3 weeks (total dose, 480 mg.). Height 51-½ inches and weight 69-½ pounds when treatment began; increased to 53 inches and 83 pounds in 12 weeks (gains of 3 percent and 18 percent, respectively). Growth was continuing post treatment.

T.T., male, age 14 years; cultural familial mental retardation and failure of physical development. Received weekly intramuscular injections of 13β-ethyl-17β-hydroxygon-4-en-3-one 17-decanoate, 40 mg. for 6 weeks and 80 mg. for 3 weeks (total dose, 480 mg.). Height 56-¼ inches and weight 68-¼ pounds when treatment began; increased to 57 inches and 78-¼ pounds in 12 weeks (gains of 1 percent and 15 percent, respectively). Growth was continuing post treatment.

A.F., male, age 10 years; cultural familial mental retardation and failure of physical development. Received weekly intramuscular injections of 13β-ethyl-17β-hydroxygon-4-en-3-one 17-decanoate, 40 mg. for 6 weeks and 80 mg. for 3 weeks (total dose, 480 mg.). Height 51-¼ inches and weight 65-½ pounds when treatment began; increased to 52-½ inches and 72 pounds in 12 weeks (gains of 3 percent and 10 percent, respectively).

Representative clinical histories to illustrate how to use 13β-ethyl-17α-ethynyl-17β-hydroxygon-4-en-3-one in the process of this invention follow:

Functional Amenorrhea

C.O., 36 years old; functional amenorrhea. Pretreatment vaginal smear strongly estrogenic. Received 5 mg. 13β-ethyl- 17α-ethynyl-17β-hydroxygon-4-en-3-one, without estrogen, per day for 5 days, begun day 20 of cycle. Post-treatment smear luteal. Menses 4 days post withdrawal of medication. Treatment repeated for 9 cycles, after which spontaneous normal menses ensued.

Primary Amenorrhea (Gonadal Dysgenesis)

S.S., aged 34; ovatestes; vaginal smear castrate. Received 2.5 mg. 13β-ethyl-17α-ethynyl-17β-hydroxygon-4-en-3-1 per day for 5 days, beginning day 20 of cycle. Menses began 6 days postwithdrawal of medication. Treatment for 6 cycles, induced artificial menses each cycle.

Secondary Amenorrhea

J.F., aged 31 years. Pretreatment vaginal smear estrogenic. Received 5 mg. 13β-ethyl-17α-ethynyl-17β-hydroxygon-4-en-3-one per day for 5 days, beginning day 20, for 6 cycles. Post-treatment smear luteal. Menses 5 to 7 days postwithdrawal of medication each month.

Postpartum Amenorrhea

V.K., aged 23 years; amenorrhea 4 months postpartum. Vaginal smear castrate. Received 5 mg. 13β-ethyl-17α-ethynyl-17β-hydroxygon-4-en-3-one per day, for 25 days, beginning day 5, for 2 cycles. Post-treatment smear luteal. Menses 5 days postwithdrawal of medication.

To Delay Menses

D.B., aged 27 years; infertility and Stein-Levinthal syndrome. Received 5 mg. 13β-ethyl-17α-ethynyl-17β-hydroxygon-4-en-3-one, with 2.5 mg. conjugated estrogen, per day for 20 days, beginning day 20 of cycle, and continued for 6 courses. Menses delayed 19 to 42 days each course. Pregnancy followed termination of treatment, with delivery at term.

To Inhibit Ovulation

J.L., aged 22 years; dysmenorrhea. Received 5 mg. 13β-ethyl-17α-ethynyl-17β-hydroxygon-4-en-3-one, with 2.5 mg. conjugated estrogen, per day for 20 days, beginning day 5 of cycle, for 3 cycles. Normal menses 5 days post withdrawal of medication, without pain.

To Produce Pseudopregnancy

D.C., aged 36 years; endometriosis, infertility, dysmenorrhea. Received 13β-ethyl-17α-ethynyl-17β-hydroxygon-4-en-3-one, with 0.1 mg. ethynyl estradiol, per day in courses of 30 days, continued for 9 months. Ovulatory period on cessation of medication after 9 months; biopsy showed secretory endometrium.

Adolescent Gynecomastia in the Male

R.B., 18 year old male; enlarged breasts. Received 15 mg. 13β-ethyl-17α-ethynyl-17β-hydroxygon-4-en-3-one daily for 3 months. Breast size greatly reduced.

Premenopausal Amenorrhea

H.W., aged 38 years. Vaginal smear strongly estrogenic. Received 5 mg. 13β-ethyl-17α-ethynyl-17β-hydroxygon-4-en-3-one per day for 5 days, geginning day 20 of cycle, for 5 cycles. Post-treatment smear luteal. Menses induced 2 days post withdrawal of medication.

Amenorrhea of Delayed Pubescence with Excessive Growth

M.A., aged 13 years; vaginal smear hypoestrogenic. Received 5 mg. 13β-ethyl-17α-ethynyl-17β-hydroxygon-4-en-3-one per day for 5 days, beginning day 20, for 13 cycles. Post-treatment smear luteal. Menses 6 to 7 days post withdrawal of medication.

Dysfunctional Uterine Bleeding

M.O., aged 53 years; dysfunctional uterine bleeding. Received 20 mg. 13β-ethyl-17α-ethynyl-17β-hydroxygon-4-en-3-one initially then 15 mg. daily, with 0.1 mg. ethynyl estradiol, for 16 days. Bleeding stopped within 6 hours, and normal withdrawal period began 12 days after discontinuance of medication.

To Regulate Menses

R.H., aged 30 years; obesity, with irregular menses. Vaginal smear strongly estrogenic, with ferning of cervical mucus. Received 13β-ethyl-17α-ethynyl-17β-hydroxygon-4-en-3-one, 5 mg., with 2.5 mg. conjugated estrogen, per day for 20 days, beginning day 5 of cycle, and continued for 6 cycles. Regular menses 4 to 8 days post withdrawal of medication.

For Contraception

A regularly menstruating and ovulating young married female received 0.5 mg. 13β-ethyl-17α-ethynyl-17β-hydroxygon-4-en-3-one, with 0.05 mg. ethynyl estradiol, daily for 25 days, beginning day 5 of cycle. Biopsy on day 25 showed a general pattern of endometrial suppression with predecidual reaction and little or no development of the vasculature.

L.P., age 27 years; Gravida 3 para 2 abortions 1, coital frequency 3 times per week, regular menstrual cycles of 28 days, average duration of flow 5 days with average amount of flow. Occasional menstrual discomfort to slight degree. The patient received 13β-ethyl-17α-ethynyl-17β-hydroxygon-4-en-3-one, 0.075 mg. (75 micrograms) daily as 1 tablet from cycle day one of the menstrual period on a continuous daily basis without interruption. Menstrual cycles were 27 and 25 days in length, amount of flow was average or heavy, length of flow 6 and 4 days. Only side effect reported was dysmenorrhea in second cycle. Efficacy: No pregnancy. Cycle control maintained. Minimal side effects.

S.C., age 23 years; Gravida 0 para 0 abortions 0, coital frequency 3 times per week. Menstrual cycles regular, average 29 days, average duration of flow 5 days. Amount of flow average, no menstrual discomfort. Patient received 13β-ethyl-17α-ethynyl-17β-hydroxygon-4-en-3-one, 0.050 mg. (50 micrograms) daily as 1 tablet on a continuous basis without interruption. Length of cycle 25 days, duration of flow 5 days, amount of flow average, no side effects. Efficacy: Patient did not become pregnant. Cycle control: comparable with pretreatment.

D.N., age 24 years; Gravida 4 para 4 abortions 0, coital frequency 4 times per week. Menstrual cycles regular, average 28 days, average duration of flow 4 days, amount of flow variable, menstrual discomfort occasional and moderate. Mode of administration: 1 tablet daily of 13β-ethyl-17α-ethynyl-17β-hydroxygon-4-en-3-one, 0.075 mg. (75 micrograms) on continuous basis. No pregnancy.

What is claimed is:

1. A composition, useful for stimulating growth of a mammal, comprising an effective growth-stimulating amount of a compound, selected from the group consisting of 13β, 17α-diethyl-17β-hydroxygon-4-en-3-one and 13β-ethyl-17β-hydroxygon-4-en-3-one 17-decanoate, and a pharmaceutically acceptable carrier.

2. A composition, useful for cyclic control in a female mammal, and for treatment of dysfunctions of the female reproductive system in a mammal, said dysfunctions being selected from the group consisting of amenorrhea, dysmenorrhea, and functional uterine bleeding, comprising an amount of 13β-ethyl-17α-ethynyl-17η-hydroxygon-4-en-3-one effective for the said purpose and a pharmaceutically acceptable carrier.

3. Composition of claim 2, wherein the amount of 13β-ethyl-17α-ethynyl-17β-hydroxygon-4-en-3-one is about 2.5 to about 25 mg.

4. A composition, useful for preventing conception in a female mammal, comprising an amount of 13β-ethyl-17α- ethynyl-17β-hydroxygon-4-en-3-one between about 0.015 and about 10 mg., effective for said purpose and a pharmaceutically acceptable carrier.

5. Composition of claim 4, wherein the amount of 13β-ethyl-17α-ethynyl-17β-hydroxygon-4-en-3-one is about 0.015 to about 1 mg.

6. A composition, useful for preventing conception in a female mammal, comprising an amount of 13β-ethyl-17α-ethynyl-17β-hydroxygon-4-en-3-one effective to prevent conception and up to about 0.05 mg. of ethynyl estradiol.

7. A method of stimulating growth in a mammal which comprises administering to said mammal a growth stimulating amount of 13β, 17α-diethyl-17β-hydroxygon-4-en-3-one.

8. A method of stimulating growth in a mammal which comprises administering to said mammal a growth stimulating amount of 13β-ethyl-17β-hydroxygon-4-en-3-one 17-decanoate.

9. A method for cyclic control in a female mammal and treatment of dysfunctions of the female reproductive system in a mammal, said dysfunctions being selected from the group consisting of amenorrhea, dysmenorrhea, and functional uterine bleeding, which comprises orally administering to said mammal a pharmaceutically effective amount of 13β-ethyl-17α-ethynyl-17β-hydroxygon-4-en-3-one.

10. A method of preventing conception in a female mammal which comprises orally administering to said mammal 13β-ethyl-17α-ethynyl-17β-hydroxygon-4-en-3-one in an effective amount of 0.015 mg. to about 10 mg. per day.

11. A method of preventing conception in a female mammal which comprises orally administering to said mammal an effective amount of about 0.015 mg. to about 1 mg. per day of 13β-ethyl-17α-ethynyl-17β-hydroxygon-4-en-3-one on a continuous basis.

12. A method of preventing conception in a female mammal which comprises orally administering to said mammal an amount of 13β-ethyl-17α-ethynyl-17β-hydroxygon-4-en-3-one effective to prevent conception in combination with up to about .05 mg. of ethynyl estradiol per day on a cyclic basis.

13. A method for control of gynecomastia in a male human which comprises administering to said male human an amount of 13β-ethyl-17α-ethynyl-17β-hydroxygon-4-en-3-one effective for said purpose.

* * * * *

UNITED STATES PATENT OFFICE
CERTIFICATE OF CORRECTION

Patent No. 3,666,858      Dated May 30, 1972

Inventor(s) Gordon Alan Hughes and Herchel Smith

It is certified that error appears in the above-identified patent and that said Letters Patent are hereby corrected as shown below:

a) Col. 8, Claim 2, line 69: "-17η-" should read:

--    -17β-    -- b) Col. 4, line 41: Insert -- -β -- between "17" and "-hydroxy-gon"

c) Col. 4, lines 27, 31, 41, 48, 56, 63, and 69;
   Col. 5, lines 1, 9, 14, 20, 25, 33, 42, 50, 56, 57, 66, and 72;
   Col. 6, lines 3, 5, 14, 21 and 26:

The numeral -- -3 -- should be inserted between "-en" and "-one" in each of the above-mentioned lines, so that the compound name will properly read as follows:

"13β,17α-diethyl-17β-hydroxygon-4-en-3-one".

Signed and Sealed this fourth Day of November 1975

[SEAL]

Attest:

RUTH C. MASON            C. MARSHALL DANN
*Attesting Officer*       *Commissioner of Patents and Trademarks*